(12) United States Patent
Whear et al.

(10) Patent No.: US 7,912,772 B2
(45) Date of Patent: Mar. 22, 2011

(54) COMPUTER-IMPLEMENTED SYSTEMS AND METHODS FOR EMERGING WARRANTY ISSUES ANALYSIS

(75) Inventors: Michael L. Whear, Howell, MI (US);
Max J. McLeod, Oak Ridge, NC (US);
Danny C. Noal, Woodhaven, MI (US);
Robert Martin Henry, Jr., Warren, MI (US)

(73) Assignee: SAS Institute Inc., Cary, NC (US)

( * ) Notice: Subject to any disclaimer, the term of this patent is extended or adjusted under 35 U.S.C. 154(b) by 1032 days.

(21) Appl. No.: 11/542,037

(22) Filed: Oct. 2, 2006

(65) Prior Publication Data

US 2007/0088776 A1    Apr. 19, 2007

Related U.S. Application Data

(60) Provisional application No. 60/722,924, filed on Sep. 30, 2005.

(51) Int. Cl.
*G06Q 10/00* (2006.01)
*G06Q 40/00* (2006.01)
*G06F 17/50* (2006.01)
*G06F 9/44* (2006.01)
*G06F 17/30* (2006.01)
*G07G 1/00* (2006.01)

(52) U.S. Cl. .................. 705/35; 705/1.1; 705/7; 705/10

(58) Field of Classification Search ................... 705/1.1, 705/7, 10, 35
See application file for complete search history.

(56) References Cited

U.S. PATENT DOCUMENTS

| | | | |
|---|---|---|---|
| 6,366,199 B1 | 4/2002 | Osborn et al. | |
| 6,643,608 B1 | 11/2003 | Hershey et al. | |
| 2003/0028403 A1 | 2/2003 | Olson | |
| 2003/0033170 A1 | 2/2003 | Bhatt et al. | |
| 2003/0046250 A1 | 3/2003 | Kuettner et al. | |
| 2003/0061104 A1 | 3/2003 | Thomson et al. | |
| 2003/0105646 A1 | 6/2003 | Siepser | |
| 2004/0122689 A1 | 6/2004 | Dailey et al. | |
| 2004/0138908 A1* | 7/2004 | Lowe et al. | 705/1 |
| 2005/0015273 A1 | 1/2005 | Iyer | |
| 2006/0184377 A1 | 8/2006 | Tan et al. | |
| 2006/0184379 A1 | 8/2006 | Tan et al. | |

OTHER PUBLICATIONS

Testing For Normality by Henry C. Thode, Chapter 12, 2002.*
Early Detection of Reliability Problems Using Information from Warranty Databases by Huaiqing Wu and William Q. Meeker, May 2002, vol. 44. No. 2.*
Some Simple Robust Methods for the Analysis of Recurrent Events by J.F. Lawless and J.C. Nadeau, IIQP Research Report RR-93-02, Feb. 1993.*
Methods for the Analysis and Prediction of Warranty Claims by J. D. Kalbfleisch, J. F. Lawless and J. A. Robinson, Technometrics, vol. 33, No. 3 (Aug. 1991), pp. 273-285.*
Business Wire, "Spotfire Launches Spotfire.net, the First Web Portal for Technical Decision-Making Communities", 4 pp. (Mar. 21, 2000).

* cited by examiner

*Primary Examiner* — Shahid R Merchant
(74) *Attorney, Agent, or Firm* — Jones Day

(57) ABSTRACT

Computer-implemented methods and systems for analyzing claims related to a warranty. Statistical analysis is performed in order to examine claim counts with respect to a time period (e.g., production period, claim period, etc.). A claim issue is detected based upon the statistical analysis with respect to the time period.

14 Claims, 19 Drawing Sheets

Emerging Issue Automated

Word Search:

Find Results [containing AT LEAST ONE of the word(s)] [▾] [                    ] in [Emerging Issue Process Group] [▾]  [Search] [Clear]

— 250

Results 1-1

| Emerging Issue Process Group |
|---|
| Vehicle Make - Vehicle Marketing Type (Function Group 4 Digits) |

Results 1-1

*Fig. 8*

Emerging Issue Automated

Category Subset:
Status: [ ▼ ] [Subset] [Clear]

Word Search:
Find Results [containing AT LEAST ONE of the word(s)] [ ▼ ] [           ] in [Emerging Issue Process Group ▼] [Search] [Clear]

Refresh this page

[Edit Status]

Results 1 - 20 of 120                                                                                                                    Page: 1 2 3 4 5 6 Next>>

| | Report Output | Emerging Issue Process Group | Defined Hierarchy Value | Defined Entity Value | Status | EI Score (Wu/Meeker) | ▼ EI Cost Score (Wu/Meeker) | First Production Month in Alert (Wu/Meeker) | Last Production Month in Alert (Wu/Meeker) | Alert Issue Date (Wu/Meeker) | EI Score (Model A) | EI Cost Score (Model A) | First Claim Month in Alert (Model A) | Last Claim Month in Alert (Model A) | Alert Issue Date (Model A) |
|---|---|---|---|---|---|---|---|---|---|---|---|---|---|---|---|
| ☐ | View HTML View PDF | Vehicle Make-Vehicle Marketing Type (Function Group 4 Digits) | Trucks | 5611 | Resolved | 506 | 506 | 11/2002 | 03/2003 | 11/2003 | 330 | 330 | 08/2003 | 11/2003 | 11/2003 |
| ☐ | View HTML View PDF | Vehicle Make-Vehicle Marketing Type (Function Group 4 Digits) | Trucks | 8757 | Resolved | 232 | 232 | 11/2002 | 04/2003 | 11/2003 | 232 | 232 | 10/2003 | 11/2003 | 11/2003 |
| ☐ | View HTML View PDF | Vehicle Make-Vehicle Marketing Type (Function Group 4 Digits) | Trucks | 3862 | Unassigned | 188 | 188 | 12/2002 | 04/2003 | 11/2003 | 140 | 140 | 03/2003 | 06/2003 | 11/2003 |
| ☐ | View HTML View PDF | Vehicle Make-Vehicle Marketing Type (Function Group 4 Digits) | Trucks | 7262 | Unassigned | 182 | 182 | 11/2002 | 02/2003 | 11/2003 | 162 | 162 | 02/2003 | 06/2003 | 11/2003 |
| ☐ | View HTML View PDF | Vehicle Make-Vehicle Marketing Type (Function Group 4 Digits) | Trucks | 3645 | Unassigned | 139 | 139 | 12/2002 | 04/2003 | 11/2003 | 34 | 34 | 03/2003 | 03/2003 | 11/2003 |
| ☐ | View HTML View PDF | Vehicle Make-Vehicle Marketing Type (Function Group 4 Digits) | Trucks | 3646 | Unassigned | 128 | 128 | 03/2003 | 04/2003 | 11/2003 | ● | ● | ● | ● | ● |

Warranty Analysis

| Desktop | Resources | Reporting And Analysis ▼ | Administrator |

Emerging Issue Automated

Category Subset:
Status: [X] [Subset] [Clear]
  Unassigned
  Assigned
Word Se Resolved  ing AT LEAST ONE of the word(s) ▼
Find Res Close in [Emerging Issue Process Group ▼] [Search] [Clear]

[Edit Status]

Results 1 - 20 of 120

| Report Output | Emerging Issue Process Group | Defined Hierarchy Value | Defined Entity Value | Status | EI Score (Wu/Meeker) | ▼ EI Cost Score (Wu/Meeker) | First Production Month in Alert (Wu/Meeker) | Last Production Month in Alert (Wu/Meeker) | Alert Issue Date (Wu/Meeker) | EI Score (Model A) |
|---|---|---|---|---|---|---|---|---|---|---|
| ☐ View HTML View PDF | Vehicle Make-Vehicle Marketing Type (Function Group 4 Digits) | Trucks | 5611 | Resolved | 506 | 506 | 11/2002 | 03/2003 | 11/2003 | 330 |
| ☐ View HTML View PDF | Vehicle Make-Vehicle Marketing Type (Function Group 4 Digits) | Trucks | 8757 | Resolved | 232 | 232 | 11/2002 | 04/2003 | 11/2003 | 232 |
| ☐ View HTML View PDF | Vehicle Make-Vehicle Marketing Type (Function Group 4 Digits) | Trucks | 3862 | Unassigned | 188 | 188 | 12/2002 | 04/2003 | 11/2003 | 140 |
| ☐ View HTML View PDF | Vehicle Make-Vehicle Marketing Type (Function Group 4 Digits) | Trucks | 7262 | Unassigned | 182 | 182 | 11/2002 | 02/2003 | 11/2003 | 162 |

COMPUTER-IMPLEMENTED SYSTEMS AND METHODS FOR EMERGING WARRANTY ISSUES ANALYSIS

CROSS-REFERENCE TO RELATED APPLICATIONS

This application claims priority to and the benefit of U.S. Provisional Patent Application No. 60/722,924 (entitled "Computer-Implemented Systems And Methods For Emerging Warranty Issues Analysis" filed Sep. 30, 2005) and U.S. patent application Ser. No. 11/493,388 (entitled "Computer-Implemented Systems And Methods For Warranty Analysis" filed Jul. 26, 2006) which claims priority to and the benefit of U.S. Provisional Application Ser. No. 60/702,688 (entitled "Warranty Analysis Systems And Methods" and filed on Jul. 26, 2005). The entire disclosures (including any and all figures) of these applications are incorporated herein by reference.

TECHNICAL FIELD

This document relates generally to computer-implemented analysis systems and more particularly to computer-implemented warranty analysis systems and methods.

BACKGROUND

In today's challenging marketplace where quality and reliability are at the forefront, warranty and other types of field failure data are becoming increasingly important to analyze and understand. In most practical situations, warranty information provides the closest representation of how a product operates in the customer's hands. However, simply reporting on warranty data is not sufficient because it is reactive, time-consuming, and often times misleading. For example, previous approaches to warranty analysis, such as the Wu/Meeker approach have not fully addressed the needs of customers. The Wu/Meeker approach is described in the following paper: Wu, Huaiqing; and Meeker, William Q. (2002), "Early Detection of Reliability Problems Using Information From Warranty Databases," Technometrics, 44, 120-133.

SUMMARY

In accordance with the teachings provided herein, computer-implemented methods and systems are provided for analyzing claims related to a warranty. Statistical analysis is performed in order to examine claim counts with respect to a time period (e.g., production period, claim period, etc.). A claim issue is detected based upon the statistical analysis with respect to the time period.

As another example, a system and method can be configured to receive warranty data and perform statistical analysis of the received warranty data. The statistical analysis includes examining claim counts with respect to a time period (e.g., production period, sales period, time in service, claim period, etc.). The statistical analysis includes calculating claim intensity estimates by using a robust estimator. One or more claim issues are detected based upon the statistical analysis with respect to the production period, the sales period, and the time in service. The detected one or more claim issues are provided to a user.

As another example, a system and method can be configured to receive warranty data and perform statistical analysis of the received warranty data. The statistical analysis includes examining claim counts with respect to a time period (e.g., production period, sales period, time in service, claim period, etc.). The statistical analysis includes using claim month seasonality factors or seasonality factors that are based on other than a claim month basis. One or more claim issues are detected based upon the statistical analysis with respect to the production period, the sales period, and the time in service. The detected one or more claim issues are provided to a user.

BRIEF DESCRIPTION OF THE DRAWINGS

FIG. 8 is a graphical user interface depicting an emerging issues automated management console.

FIG. 9 is a graphical user interface for displaying an accumulated list of emerging issues automated alerts.

FIGS. 11-18 are graphical user interfaces depicting examples of emerging issues analysis and alert screen displays.

DETAILED DESCRIPTION

Figure 1:
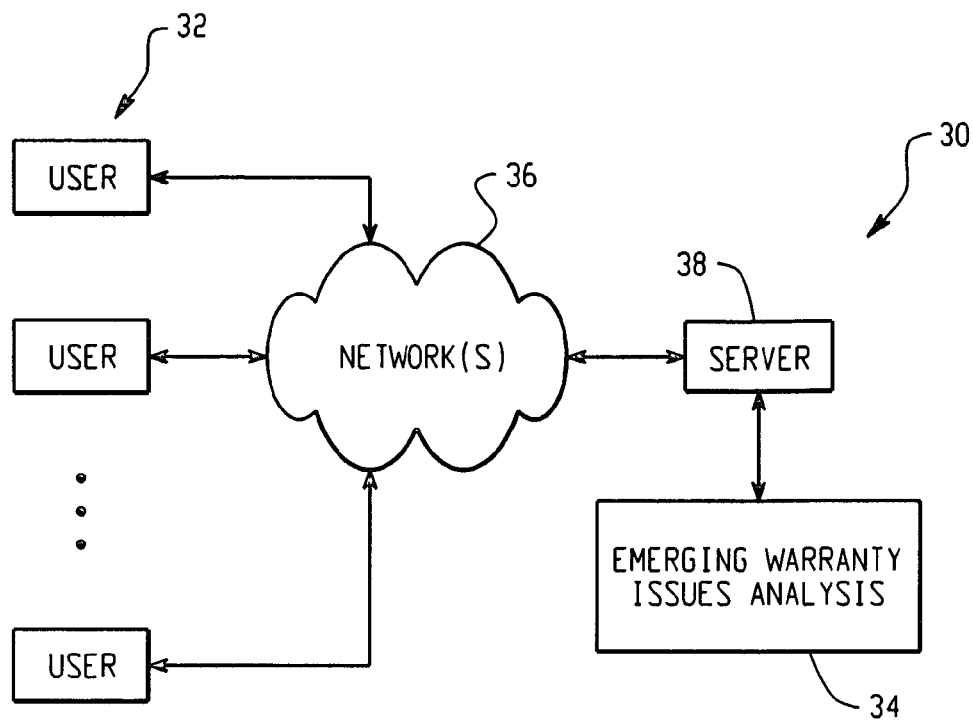
FIG. 1 is a block diagram depicting software and computer components for performing warranty analysis.

FIG. 1 is a block diagram depicting software and computer components for performing warranty analysis. More specifically, FIG. 1 depicts at 30 an environment wherein users 32 can interact with an emerging warranty issues analysis system 34 to analyze claims and/or other aspects associated with a warranty program. A warranty program may assume many forms but typically is a set of contractual rules between an organization and a customer detailing how, and for how long, the organization will cover repairs on a product.

The users 32 can interact with the system 34 through a number of ways, such over one or more networks 36. A server 38 (which could also be a system of servers) accessible through the network(s) 36 can host the system 34. It should be understood that the system 34 could also be provided on a stand-alone computer for access by a user.

The system 34 can be an integrated web-based reporting and analysis tool that provides users flexibility and functionality for performing warranty related problem identification, prioritization, and definition for root cause analysis. Multiple data sources (e.g., call center, customer survey, end-of-line audit) could be incorporated to obtain a complete picture of products' field performance.

Figure 2:
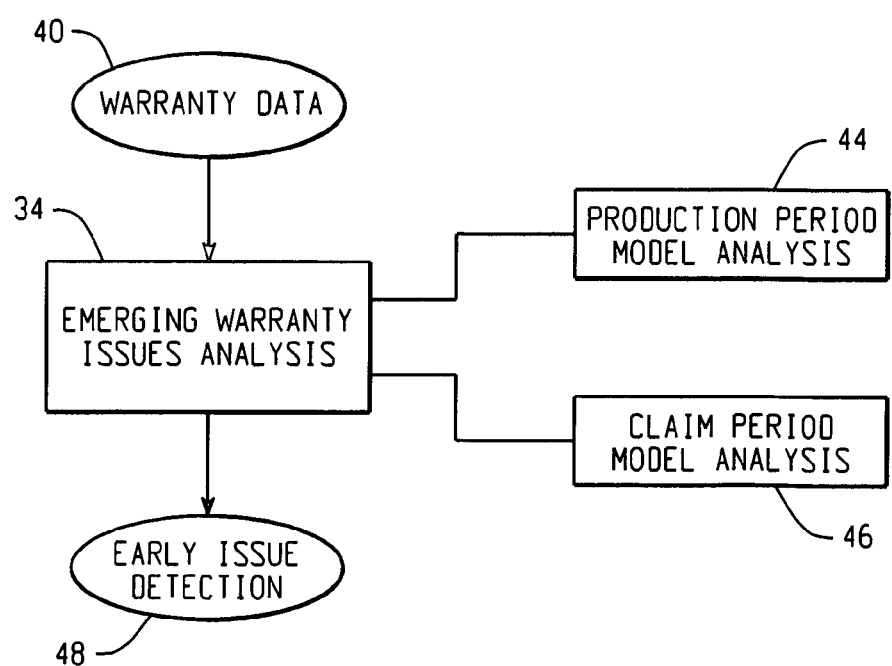
FIG. 2 is a block diagram depicting that different analysis techniques can be used to perform warranty analysis upon warranty data and/or other types of data.

FIG. 2 depicts that different analysis techniques can be used to perform warranty analysis upon warranty data 40 and/or other types of data (e.g., information from call centers that handle warranty claims, such as vehicle repair shops). As shown in FIG. 2, emerging warranty issues analysis 34 can include production period model analysis 44 and claim period model analysis 46 for early issue detection 48.

Figure 3:
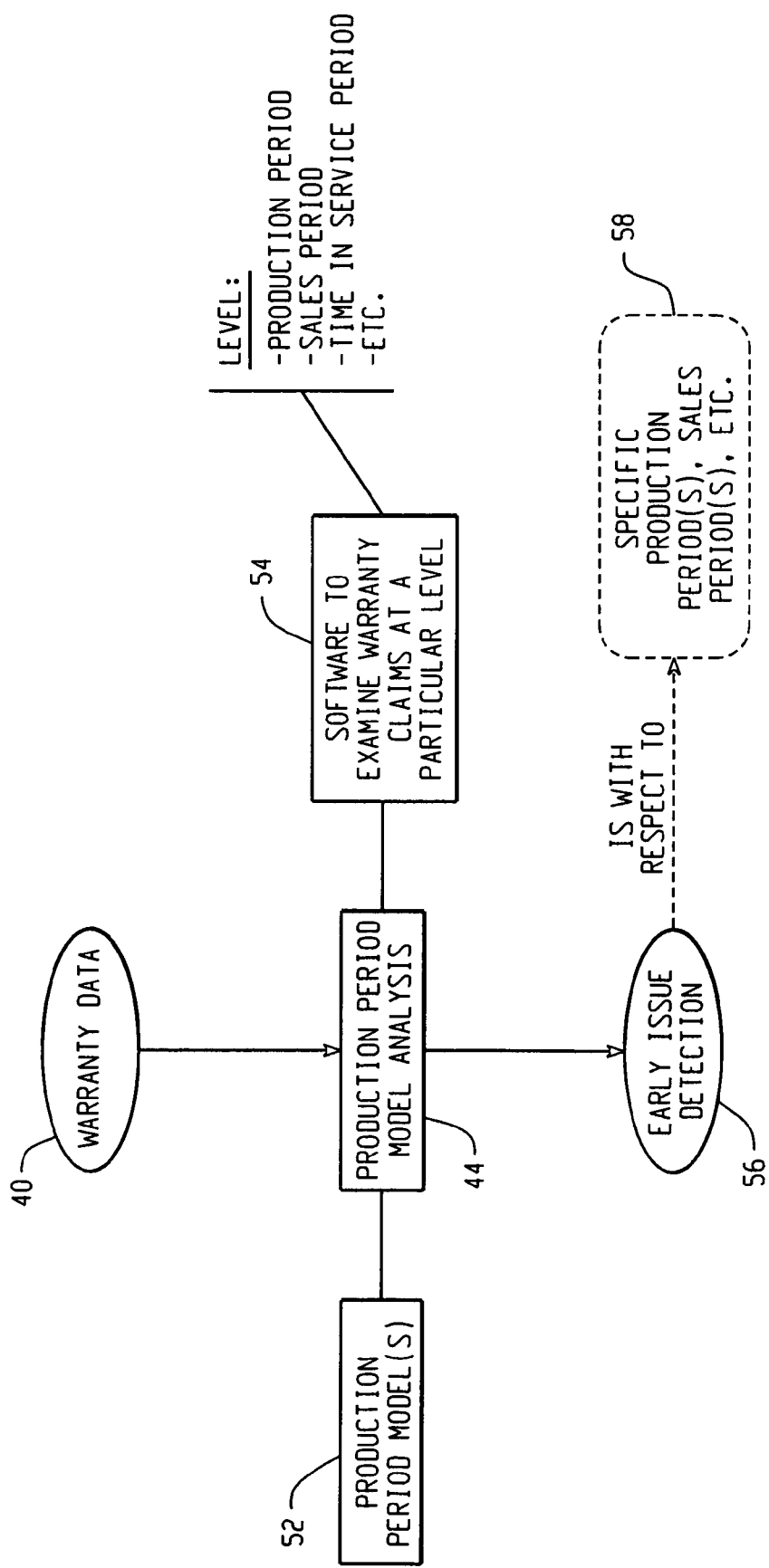
FIG. 3 is a block diagram depicting production period model analysis.

FIG. 3 depicts production period model analysis 44 of data, such as warranty data 40. Production period model analysis 44 analyzes warranty data 40 with the intent of the early detection 56 of serious problems related to specific production periods 58. The production period model approach uses software 54 to examine claim counts at the level of a production period, sales period, and time in service. Although the product period model 52 builds upon the Wu/Meeker approach and the notation used herein for the production period model is consistent with notations from the Wu/Meeker reference, the production period model 52 differs from the Wu/Meeker approach in many ways. For example a system and method for doing the production period model 52 can be configured to be different from the Wu/Meeker approach by the way that claim intensity estimates are calculated and by the introduction of claim month seasonality factors.

Figure 4:
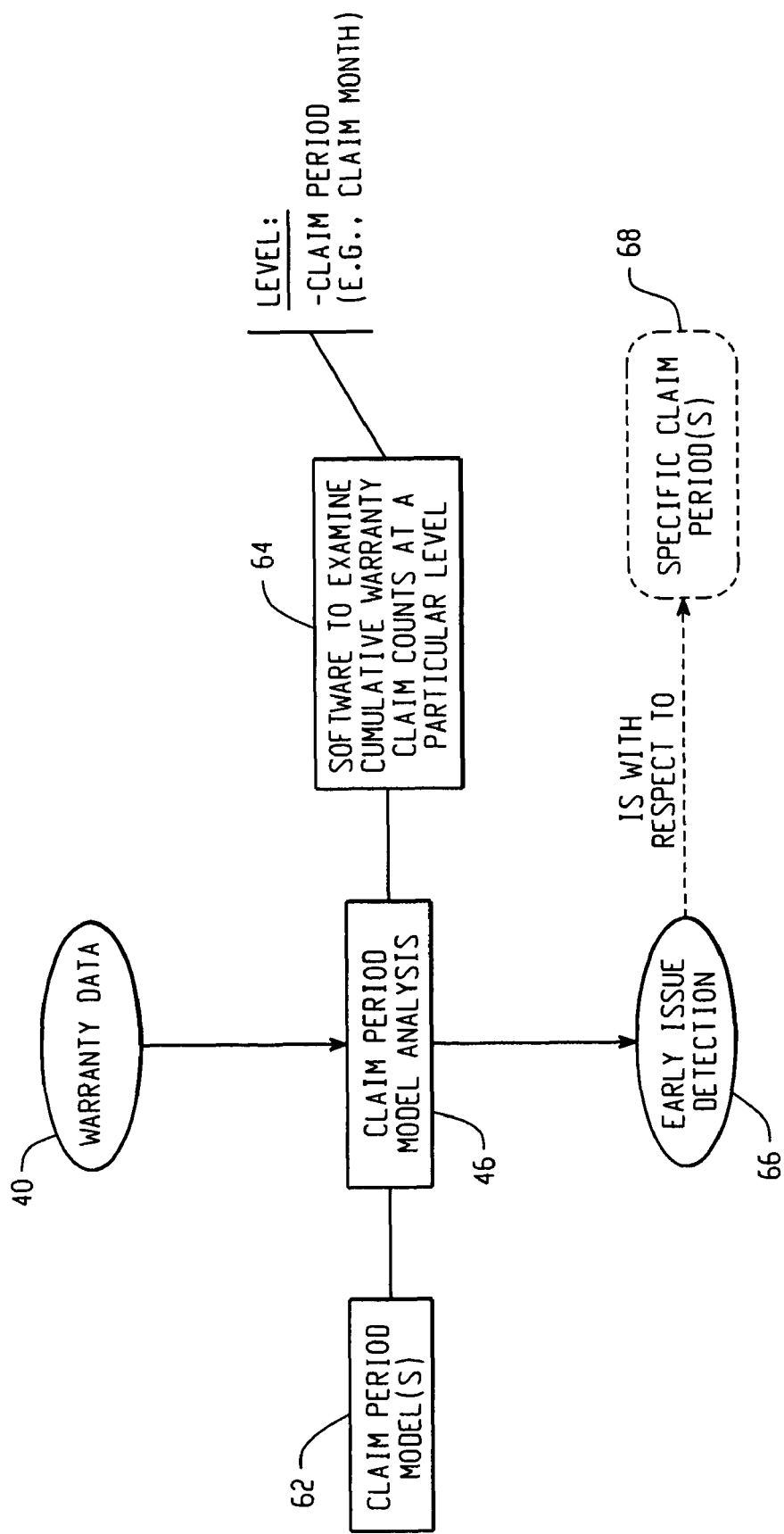
FIG. 4 is a block diagram depicting claim period model analysis.

FIG. 4 depicts claim period model analysis 46 of data, such as warranty data 40. A claim period model 62 analyzes warranty data 40 with the intent of the early detection 66 of serious problems related to specific claim periods 68. A claim period model approach 44 uses software 64 to analyze warranty data with the intent of early detection 66 of serious problems related to specific claim periods 68. The claim period model 62 uses the same underlying model as the production period model approach but examines cumulative claim counts at the level of a claim month.

Figure 5:
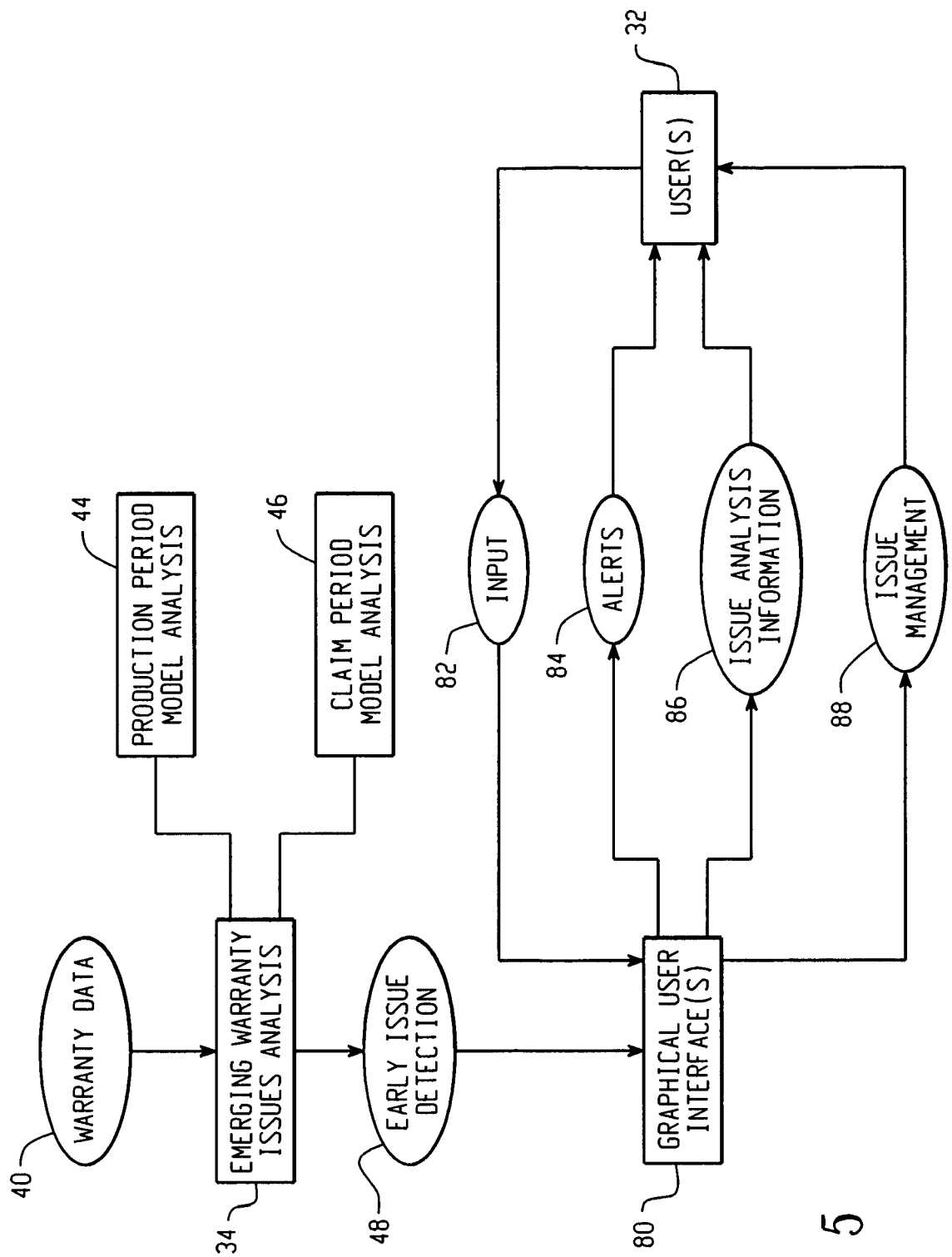
FIG. 5 is a block diagram illustrating that a user via graphical user interface displays can view a wide assortment of information associated with early issue detections.

FIG. 5 illustrates that a user via graphical user interface displays 80 can view a wide assortment of information associated with early issue detections 48. The user can provide input 82 to indicate what information the user is interested in viewing, and displays can be generated to provide information about one or more early issues that have been detected. For example a user can see what alerts 84 have been generated with respect to a warranty, as well as receive issue analysis information 86 associated with an alert. A graphical user interface can also be generated to provide information 88 for management of flagged production and claim periods.

Figure 6A:
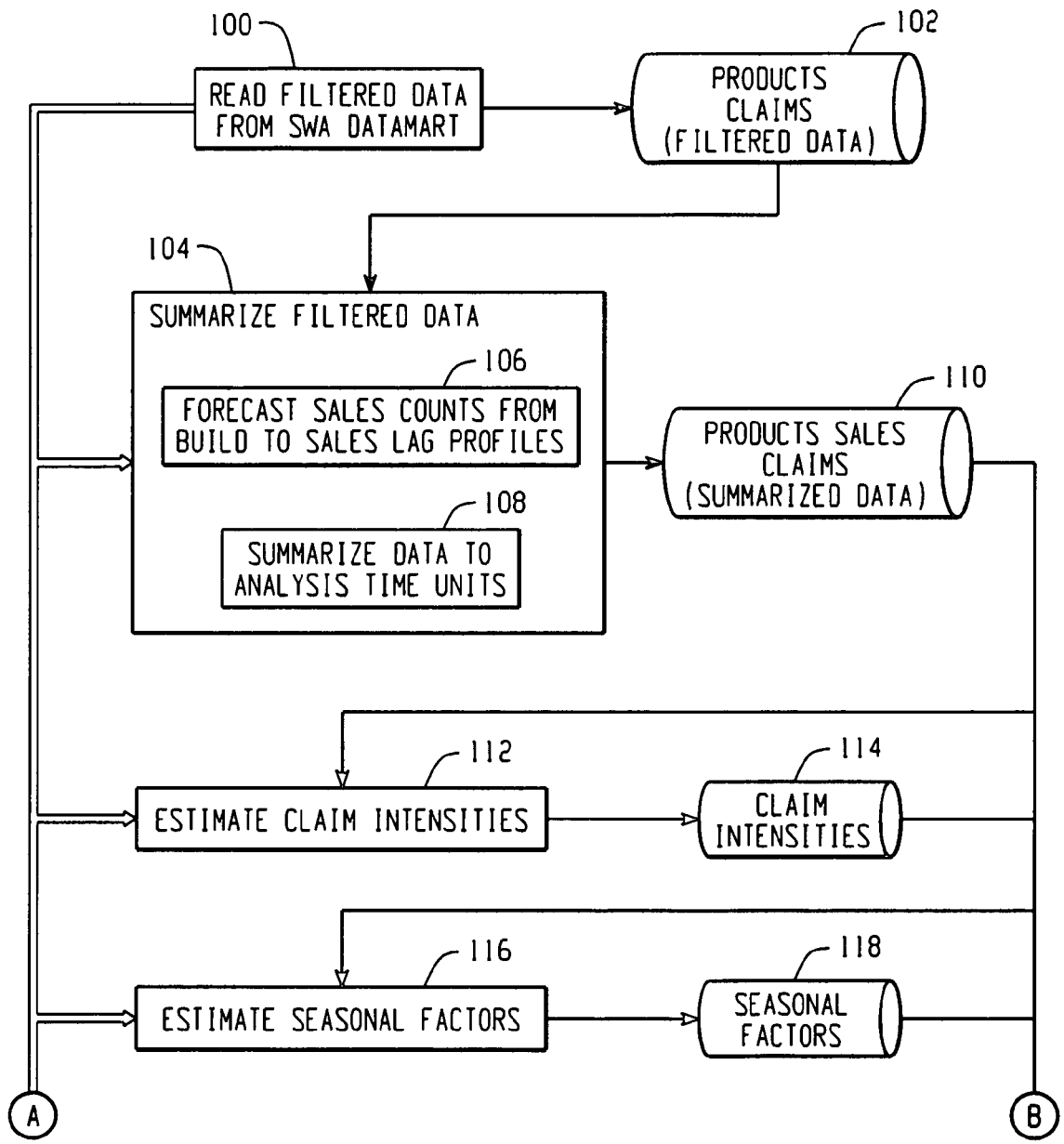
FIGS. 6A and 6B are process flow diagrams wherein production period model analysis and claim period model analysis can be performed.
Figure 6B:
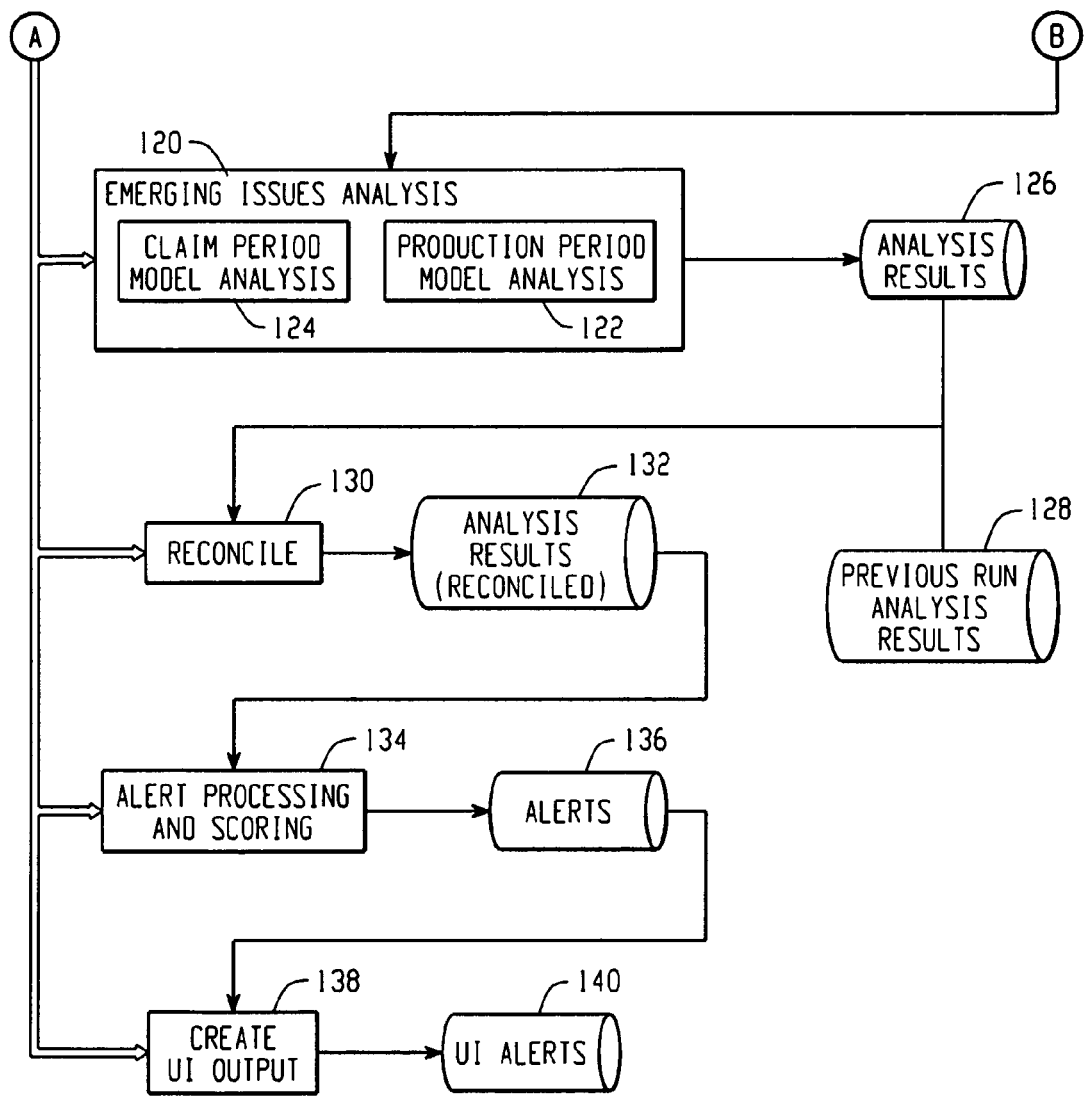

Production period model analysis and claim period model analysis can be used separately by a user or both can be used by a user as shown in FIGS. 6A and 6B. Step 100 obtains data that is to be the basis for the warranty analysis. A user can filter from a large database of warranty data the specific data that the user would like to have analyzed and store the summarized data at 110. The filtered data is stored at 102. At step 104, summarizing of data includes forecasting sales counts at 106 from build to sales lag profiles as well as summarizing data at 108 to the time units that will be used for the warranty analysis. An approach to summarizing as depicted at 104 could be performed as described in the U.S. patent application Ser. No. 11/493,388 (entitled "Computer-Implemented Systems And Methods For Warranty Analysis" filed Jul. 26, 2006) which is hereby incorporated by reference. For example, the section entitled "Automated Analytic and Analytical Watch List Emerging Issues Processing Details" in that patent application describes different data processing that can be done.

The summarized data is provided to step 112 which estimates claim intensities to generate claim intensities 114. When historic data is available, a standard method (e.g., an averaging technique) for estimation of the claim intensity for units in the $k^{th}$ time in service period is $$\lambda_k^0 = \frac{\sum_i \sum_j R_{ijk}}{\sum_i \sum_j n_{ij}},$$

where the sums range over all production and sale periods with units in the $k^{th}$ time in service period. As can be seen $\lambda_k^0$ is the average number of claims that occur for the $k^{th}$ time in service period.

However detection problems (Type II errors) can occur when the historic data is used to calculate the estimate contained production periods with considerably higher than normal claim intensities. For these issues, robust estimators are used for claim intensities. A robust estimator (e.g., an M-estimator) is not unduly affected by small departures from model assumptions (e.g., not unduly affected by outliers).

For the notation in what follows define $$x_{ik} = \sum_j R_{ijk} \text{ and } N_i = \sum_i n_{ij}$$

then $$\lambda_k^0 = \frac{\sum_i x_{ik}}{\sum_i N_i}.$$

Also in the following notation, the 0 superscript and k subscript are dropped in the following.

With respect to least square estimation, note that the above estimate of the claim intensity comes about as the value of $\lambda$ that minimizes the least squares function $$L_1^2 = \sum_i W_i \left(\frac{x_i}{N_i} - \lambda\right)^2 \text{ where } W_i = \frac{N_i}{\sum_i N_i} \text{ or } W_i = N_i.$$

With respect to robust estimation, a choice of a robust estimator of the claim intensity is to use an M-Estimate. In general an M-Estimate is the value of $\hat{\theta}$ that minimizes $$\sum_{i=1}^{N} \rho(x_i, \theta),$$

or equivalently the value that satisfies $$\sum_{i=1}^{N} \psi(x_i, \theta) = 0 \text{ where } \psi = \frac{\delta \rho}{\delta \theta}.$$

For a Huber M-Estimate:

$$\psi(x) = \psi_{Huber}(x) = \begin{cases} -k, & \text{if } x < -k \\ x, & \text{if } -k \leq x \leq k \\ k, & \text{if } k < x \end{cases}.$$

Figure 7:
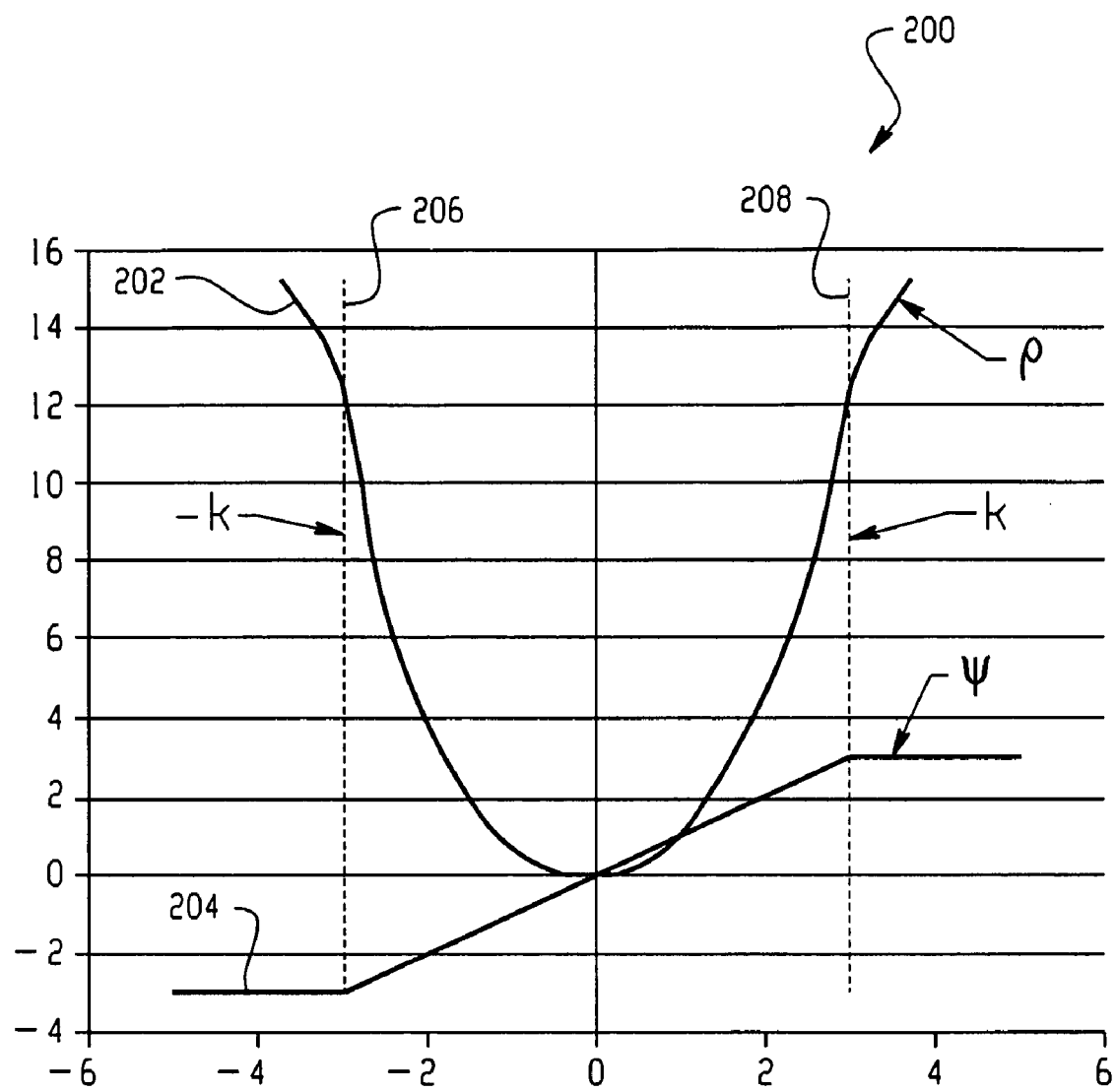
FIG. 7 is a graph of the Huber function.

FIG. 7 shows at 200 a graph of the Huber function, which provides a graph of ρ at 202 and ψ at 204, with κ and −κ also displayed respectively at 206 and 208 on the graph 200.

As another example of a robust estimator that can be used to estimate claim intensities, a value of λ can be selected that minimizes $$H = \sum_i W_i \rho\left(\frac{\frac{x_i}{N_i} - \lambda}{\sigma_i}\right) \text{ where } W_i = \frac{N_i}{\sum_l N_l},$$

ρ is the Huber function as above, and $$\sigma_i = \sqrt{\frac{\lambda(1-\lambda)}{N_i}}.$$

While $\sigma_i$ is a function of λ this can be ignored when the following derivatives are calculated.

Finding a value of λ that minimizes H is equivalent to finding a value of λ such that $$f(\lambda) = \frac{dM(\lambda)}{d\lambda} = -\sum_i \frac{W_i}{\sigma_i} \psi\left(\frac{\frac{x_i}{N_i} - \lambda}{\sigma_i}\right) = 0.$$

Newton's method can be used to approximate the solution to the above, with iteration equation given by $$\lambda_{k+1} = \lambda_k - \frac{f(\lambda_k)}{f'(\lambda_k)}$$

for k=0,1, . . . (Note that k is used here as the iteration counter not the time in service index). Where $\lambda_0$ is calculated as the least squares estimator and $$f'(\lambda) = \sum_i \frac{W_i}{\sigma_i^2} \psi'\left(\frac{\frac{x_i}{N_i} - \lambda}{\sigma_i}\right) \text{ and } \psi'(x) = \begin{cases} 0, & \text{if } < -k \\ 1, & \text{if } -k <= x <= k \\ 0, & \text{if } k < x \end{cases}.$$

Now f and f' can be expanded as follows $$f(\lambda) = k \sum\nolimits^- \frac{W_i}{\sigma_i} - \sum\nolimits^0 \frac{W_i}{\sigma_i}\left(\frac{\frac{x_i}{N_i} - \lambda}{\sigma_i}\right) - k\sum\nolimits^+ \frac{W_i}{\sigma_i} \text{ and } f'(\lambda) =$$

$$\sum\nolimits^0 \frac{W_i}{\sigma_i^2} \text{ where } \sum\nolimits^-$$

denotes a sum over the indexes for which $$\left(\frac{\frac{x_i}{N_i} - \lambda}{\sigma_i}\right) < -k, \sum\nolimits^+$$

denotes a sum over the indexes for which $$\left(\frac{\frac{x_i}{N_i} - \lambda}{\sigma_i}\right) > k, \text{ and } \sum\nolimits^0$$

denotes a sum over the indexes for which $$-k \leq \left(\frac{\frac{x_i}{N_i} - \lambda}{\sigma_i}\right) \leq k.$$

Then the Newton's method ratio above equations can be rewritten in the following form $$\frac{f(\lambda)}{f'(\lambda)} = \frac{\sigma_0 k\left(\sum\nolimits^- W_i \sqrt{N_i} - \sum\nolimits^+ W_i \sqrt{N_i}\right) - \sum\nolimits^0 W_i N_i\left(\frac{x_i}{N_i} - \lambda\right)}{\sum\nolimits^0 W_i N_i}$$

where $\sigma_0 = \sqrt{\lambda(1-\lambda)}$

This is a form that can be used in the claim intensities estimations.

A user is provided with a choice of the range of production periods, the Huber function k and the number of iterations of Newton's method. Note that in the Newton's method, the initial seed value can be the value obtained from using the least squares approach discussed in the aforementioned Wu/Meeker paper.

If seasonal factor estimation is desired, then processing continues at step 116 (which is described further below). If seasonal factor estimation is not to be used, then processing continues at step 120 so that emerging issue analysis can occur. Depending upon what type of warranty analysis is to be performed, step 120 performs either or both a production period model analysis 122 and/or claim period model analysis 124 in order to generate analysis results 126.

Production period model analysis 122 augments the Wu/Meeker analysis approach in many ways. As an illustration, a system and method for doing production period model analysis can be configured to be different from the Wu/Meeker approach, such as by incorporating the claim intensity estimation approach described above and/or by the using claim month seasonality factors calculations described below.

As another example, the Wu/Meeker approach requires that the in service date be known for each unit that is in the customer's hands. This date value is used to identify how long a product has been in service, given a particular point in time. In some industries, such as automotive, this information is readily available to a company (e.g., a car dealership tells the OEM when a vehicle is sold to a customer). However, in many other industries such as electronics and white goods, the in service date of a unit is typically unknown until a claim is made on that unit or the customer submits their warranty registration card for the product (typically, a low percentage of customers actually submit that information to the OEM). Production period model analysis can estimate the time in service of those units that do not have an in service date in the data (e.g., those units that did not have a claim in the data). This process uses the build date of the unit and a 'build to sale lag' profile which is a lognormal distribution of the number of days between the time a unit was built and the time it went into service. The profile is developed from those units that have an in service date in the data. For more information regarding the build to sale lag profile and how time in service is transformed from a 'from build date' to a 'from in service date' perspective, please refer to the provisional application entitled "Warranty Analysis Systems and Methods" (Ser. No. 11/493,388) filed Jul. 26, 2006 which is hereby incorporated by reference herein.

Claim period model analysis 124 performs an analysis on the cumulative number of claims received in a claim period for products produced in the last M periods. The notation used herein follows the notation introduced in the Wu Meeker paper, with additional parameters being:

t—Claim period index, $t=1,\ldots,M$. Note that the first claim period is observed in the period following the first production and sale (in service) period.

$S_t$—Total product that went into service, from the last M production periods, in period $t-1$, i.e., total product going into service in the period preceding the $t^{th}$ claim period.

$C_t$—The total number of claims received in claim period t from the last M production periods.

The above parameters relate to the reference parameters as follows:

$$S_t = \sum_{j=1}^{t} n_{j(t-(j-1))}$$

$$C_t = \sum_{i=1}^{t} \sum_{j=1}^{t-(i-1)} R_{t-(i-1)-(j-1)}$$

With reference to the notations provided in the Wu/Meeker paper, under the null hypothesis, the expected number of claims in claim period t is given by:

$$E_t = \sum_{l=1}^{t} \lambda_{t-(l-1)}^0 S_l$$

where $\lambda_k^0$ is the estimate of the claim intensity for units in the $k^{th}$ time in service period estimated using historic data.

A claim period model algorithm approximates the distribution of $C_t$ as a Poisson distribution with mean $E_t$.

For each level of t an $\alpha^*$-level critical value ($CV_t$) is calculated using the Poisson distribution, where $\alpha^*$ is calculated from a specified nominal $\alpha$ as $\alpha^*=1-(1-\alpha)^{1/M}$. If $C_t \geq CV_t$ then claim period t is flagged.

As mentioned above, processing can include estimation of seasonal factors at step 116. The estimated seasonal factors 118 are multiplicative and account for variations in claim levels relative to the claim month. For example, air conditioning claims will generally peak in the summer months.

The seasonal factors are estimated using a logistic regression model. The following uses the notation in the reference. Note that the number of production periods selected for seasonal factor estimation ($M_s$) is not necessarily equal to the number of production periods selected for claim intensity estimation.

For each level of k ($k=1,\ldots,M_s$) and m ($m=1,\ldots,12$) calculate the claim sum $$T_{km} = \sum_i \sum_j R_{ijk}$$

where the sum is over all combinations of i,j and k where $R_{ijk}$ occurs in claim month m.

Corresponding to each claim sum calculate the sales sum $$N_{km} = \sum_i \sum_j n_{ij}$$

where the sum is over all combination of i and j that were used in the claim sum.

From these the claim sum to sale sum ratio is $$p_{km} = \frac{T_{km}}{N_{km}}.$$

Model $p_{km}$ using a logistic model $$\text{logit}(p_{km}) = \log\left(\frac{p_{km}}{1-p_{km}}\right) = \alpha + B_k + C_m.$$

In this model the $B_k$ factors account for the time in service and the $C_m$ factors account for the seasonal variation.

If the $C_m$ factors explain a significant amount of the variation in $p_{km}$ for a specified significance level then preliminary seasonal factors are calculated from the corresponding odds ratios ($O_m$) for $C_m$. Assuming the odds ratios are calculated relative to m=12 then the seasonal factors are calculated as $$F_{12} = \frac{12}{1 + \sum_{m=1}^{11} O_m} \text{ and } F_m = F_{12} \times O_m$$

for $m=1,\ldots,11$. Note that it necessarily follows that $$\sum_{m=1}^{12} F_m = 12.$$

The preliminary seasonal factors are next evaluated for consistency over time. This can be done since the $C_m$ factors may be significant on the basis of having a large claim count for a single period of time.

A consistency check is performed based on the actual and expected number of claims that occur in each claim month for the selected production periods. The expected number of claims is calculated using a claim period model where the fit is made without using seasonal adjustments.

The consistency check counts the number of times that the seasonal adjusted expected count is closer to the actual count than is the non-seasonally adjusted expected count. If the total count is significant (e.g., based on the Binomial distribution) at a specified significance level then the data series is assumed to be seasonal and the preliminary seasonal factors are retained for use with the Emerging Issues analysis.

Because the data selection for seasonal factor calculation is based on a moving production period window and that emerging issues analysis can be run on a periodic basis, an issue can arise in relation to the seasonal factors. One could have seasonal factors that are judged to be significant and consistent for one run and not for a future run; significance is a binary decision. Turning the seasonal factors on and off between runs would result in inconsistent results between the runs.

On the other hand it can very well happen that a series can at some time appear seasonal when it is not and later observation could make this apparent. In this case it would make sense to turn off the seasonal factors.

To address this a second significance level can be introduced that is used to determine when the evidence in the data is against the presence of seasonality. In the above, there are two significance tests performed that are associated with the logistic model and the consistency check. Both are specified as an alpha level. The first alpha level is set to a small value, say 0.01, and is used to determine when seasonal factors should be retained for a series. The second alpha level is set to a larger value, say 0.2, and is used to determine when previously retained seasonal factors should be turned off.

A production period model approach can be implemented for periods corresponding to calendar months. If multiplicative claim month seasonal factors are available then the algorithm applies the factors as follows.

Denote the seasonal factors as $F_m$, m=1,...,12, where m=1 corresponds to the calendar month of January, etc. Also assume that $$\sum_{m=1}^{12} F_m = 12.$$

For a given production period i, sales period j and time in service period k the expected number of claims is given by $$E_{ijk} = n_i \lambda_k^0 \sum_{l=1}^{j} f_{il}.$$

Approximate the distribution of $S_{ijk}$ using a Poisson distribution with mean $E_{ijk} F_{M(i,j,k)}$ where $M(i,j,k)$ is a function that returns the appropriate calendar month for specific values of i,j and k.

With respect to claim period analysis, a claim period model approach can be implemented for periods corresponding to calendar months. If multiplicative claim month seasonal factors are available then the algorithm applies the factors as follows.

Denote the seasonal factors as $F_m$, m=1,...,12, where m=1 corresponds to the calendar month of January, etc. Also assume that $$\sum_{m=1}^{12} F_m = 12.$$

Calculate $E_t$ as in the section describing claim period model analysis, and then approximate the distribution of $C_t$ as a Poisson distribution with mean $E_t F_{M(t)}$ where $M(t)$ is a function that returns the appropriate calendar month for a value of t.

With respect to emerging issues reconciliation, because the data used to estimate parameters is specified as a moving window spanning a specified number of production periods, each emerging issues analysis run re-estimates parameters (e.g., claim intensity or seasonal factors) from data that spans different time periods. If successive runs of an emerging issues analysis were made independently then situations would occur where a production (or claim period) is flagged in one run and not flagged in the next. The reason that this occurs is that statistical tests are made on the basis of the comparison of an integer claim count to an integer critical value and a slight change in the underlying claim intensity estimates, for example, can result in a unit change of the critical value from one run to the next. This is an undesirable situation from the standpoint of the client/customer who is attempting to manage emerging issues alerts and to make decisions on allocation of resources to deal with warranty issues.

To address this situation emerging issues analysis can employ a reconciliation process at step 130 for generating reconciled analysis results 132 that assures that results are consistent from one run to the next (e.g., analysis results 126 are reconciled with previous run analysis results 128). Reconciliation involves calculating statistical hypothesis test critical values the first time that a period claim count becomes available. In subsequent runs though the claim count is updated (e.g., incorporating in-process claims that were not available when the count was first calculated) and re-compared against the critical value.

Reconciliation Steps can include:
1. All critical values for any claim count quantities that were calculated in the prior run are retained.
2. Any periods (production or claim) that were flagged as significant in the prior run remain flagged.
3. All claim count quantities are recalculated and compared against the reconciled set of critical values. If a reconciled claim count exceeds a reconciled critical value then the corresponding period is flagged.

Note that the analysis results 128 from the prior run were also reconciled. Also note that all alert processing is performed against the reconciled analysis results. Hence alerts and alert indices reflect what is contained in the reconciled analysis results 128.

With respect to alert processing and scoring at step 134, the production period model approach monitors claims by production period while the claim period model approach monitors claims by claim period. Both methods apply a statistical hypothesis test to each period in a monitoring window. As a result many of the individual periods tested may be flagged because they have significantly higher claim levels than a baseline set of periods.

Rather than presenting a list of all the flagged periods to the user, emerging issues analysis can use alert processing to consolidate multiple periods into alerts 136. Alert processing can include the following:
1. Flagged periods that occur close to each other in time are likely due to the same underlying root cause
2. A list of all the flagged periods may possibly overwhelm the user and is more difficult to successfully manage An alert is a sequence of one or more periods (production or claim) where one or more of the periods are flagged and fewer than a specified number, called an alert gap, of unflagged periods separate the flagged periods. The periods contained in an alert can be configured not to overlap those contained in any other alert.

An alert starts and ends with a flagged period, which can be termed an alert extent. The starting and ending periods may be extended as the analysis procedure (e.g., production period model) used to flag periods is run through time. Newly flagged periods either start a new alert or extend an existing alert depending on whether the newly flagged month is beyond or within the alert gap of an existing alert, respectively. In the event of a tie (e.g., a new alert is within the alert gap of more than one existing alert), then alerts are extended in favor of alerts occurring later in the sequence of time.

With respect to alert scoring at step 134, as a result of emerging issues analysis there may be hundreds or even thousands of emerging issues alerts generated. To assist users in prioritizing the alerts for further investigation and action the system can generate an index score for each alert, which can include the following:

1. The alert index score should increase as the claim intensity increases.
2. The alert index score should increase with the number of flagged periods included in the alert extent.

The alert index score calculation can be different for the two analysis methods (e.g., the claim period model analysis and production period model analysis).

For a claim period model analysis approach the alert score index (ASI) is calculated as follows:

1. For each claim period contained in a claim period model alert extent a claim period score index is calculated as $CPSI=(C_t-E_t)$ where $C_t$ is the total number of claims received in claim period t from the last M production periods and $E_t$ is the expected number of claims for the claim period.
2. The alert score index is then calculated as $ASI=\Sigma CPSI$ where the sum is over all claim periods included in the alert.

For the production period model alert score index calculation, for any production period this analysis compares actual counts to expected counts over the range of up to M in service times. A production period can be flagged if a significant variance occurs anywhere across the range of in service periods. Hence it can happen that the number of claims received for a flagged production period does not exceed the expected number of claims for the production period. So the approach used to calculate the claim period model alert score index cannot be used here.

For the production period model analysis approach the alert score index (ASI) is calculated as follow:

1. For each production period contained in a production period model alert extent a production period score index is calculated as $PPSI=\Sigma \max(0, R_k-E_k)$ where the sum is over all observed in service periods for the production period, $R_k$ is the observed number of claims for the $k^{th}$ in service period, and $E_k$ is the expected number of claims for the $k^{th}$ in service period.
2. The alert score index is then calculated as $ASI=\Sigma PPSI$ where the sum is over all production periods included in the alert.

The system also provides the ability to calculate one or more alert cost indices. An alert cost index is calculated as $ACI=C*ASI$ where C is the average cost for a claim of the type that is being analyzed.

With respect to emerging issues automated process administration, the automated emerging issues process provides at step 138 users with a purposeful and intuitive interface 140 for managing the list of alerts produced by the production period model and claim period model analysis methods. Each distinct way of running these methods is presented in the emerging issues automated management console depicted at 250 in FIG. 8. This initial screen identifies the process groups (i.e., the various ways for which the process is run) and allows users to search and sort through this list.

By clicking the process group of interest, the user is then presented with the accumulated list of emerging issues automated alerts of both production period model and claim period model types as shown at 300 in FIG. 9. The list is comprised of results from multiple runs and includes alerts related to all values of the defined hierarchy and defined entity. The tabular list of alerts is sorted by descending Wu/Meeker score (e.g., alert score index value generated by the production period model approach) by default, but it may be resorted by the user as necessary to assist with investigation or prioritization. The term "Model A" refers to the claim period model approach. Users may search the information to find alerts of specific interest. Included in this management console is the ability for users to view and for administrators to edit an alert status. This feature allows certain alerts to be processed as they are prioritized for resolution. An alert may be resolved, closed, assigned, or unassigned. The interface allows users to view the status of interest. This facilitates the regular process of managing new alerts and alerts that have been assigned for investigation.

Figure 10:
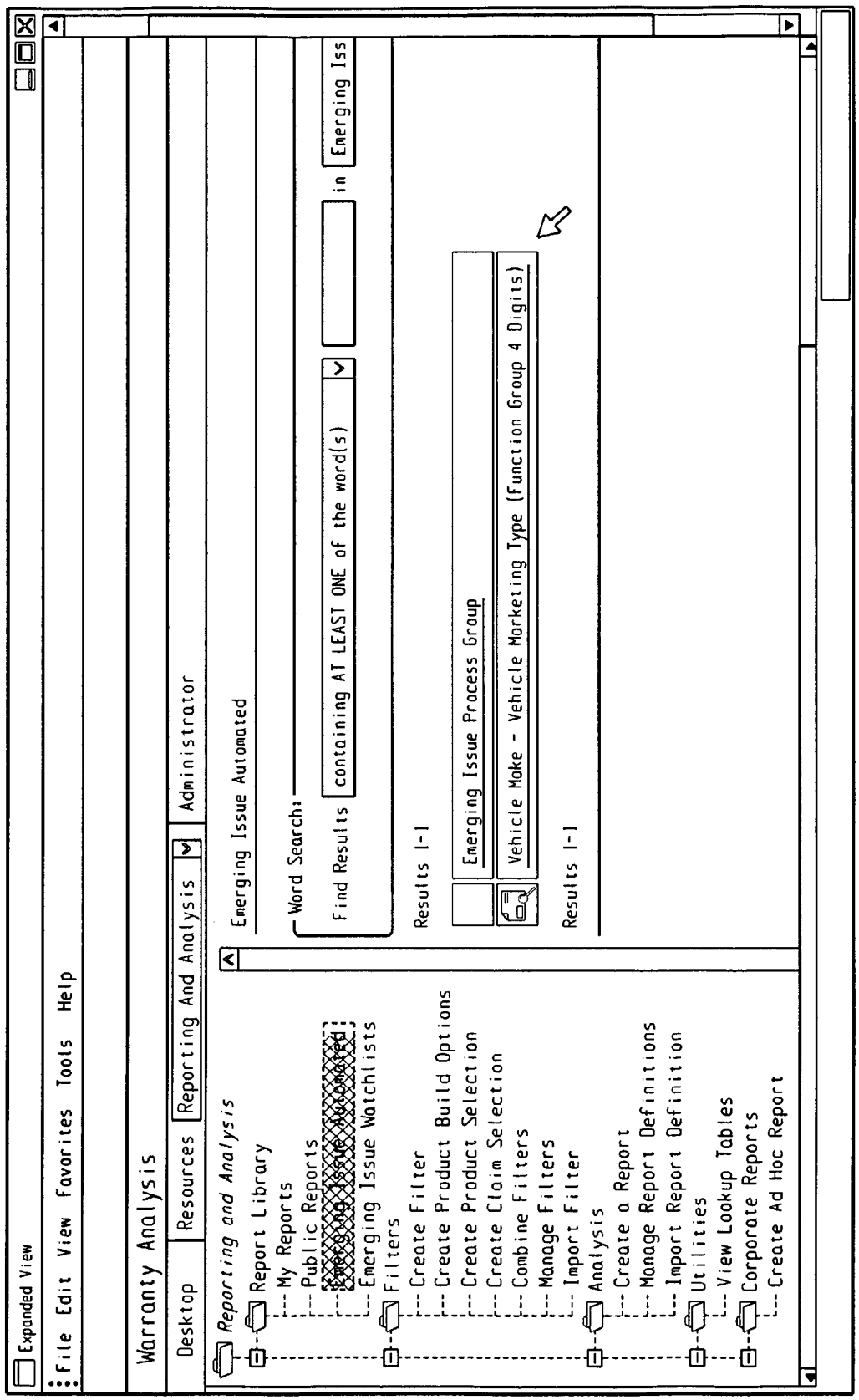
FIG. 10 is a graphical user interface depicting a display for a user to access emerging issue information for a process group.

It should be understood that many different types of user interface displays may be utilized with the analysis techniques disclosed herein. As an illustration, FIG. 10 shows at 350 a graphical user interface (GUI) wherein a user can access emerging issue information for a process group.

Figure 11:
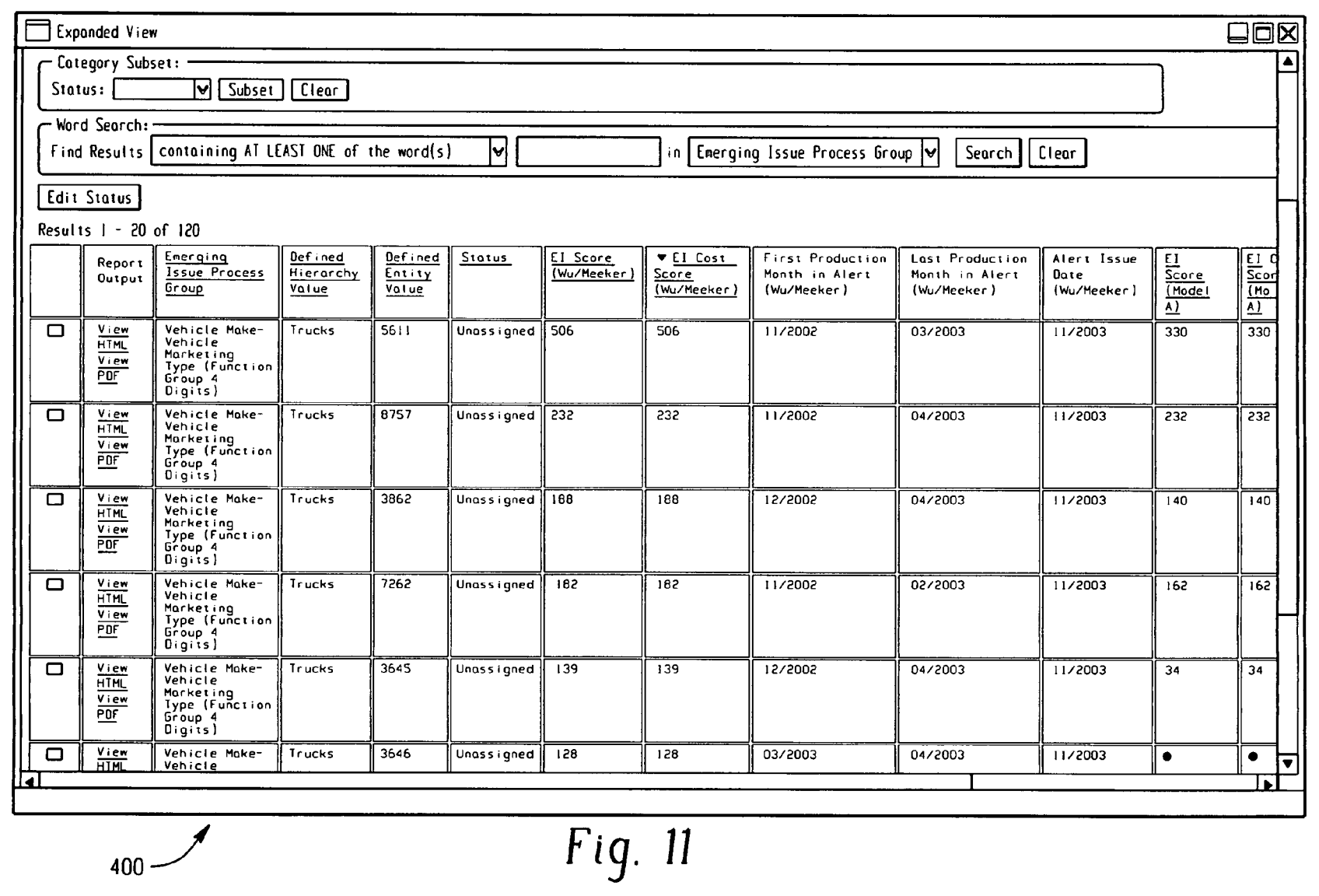

As other illustrations, FIG. 11 shows at 400 a GUI wherein a user is shown emerging issues as sorted by a Wu/Meeker score (as generated by a production period model approach). For example, the first row in the table shows for a particular vehicle that there was a Wu/Meeker score of 506. This indicates that there were 506 greater than expected claims for vehicles produced in the analyzed production period. In this example, the production period was from November 2002 to March 2003.

Figure 12:
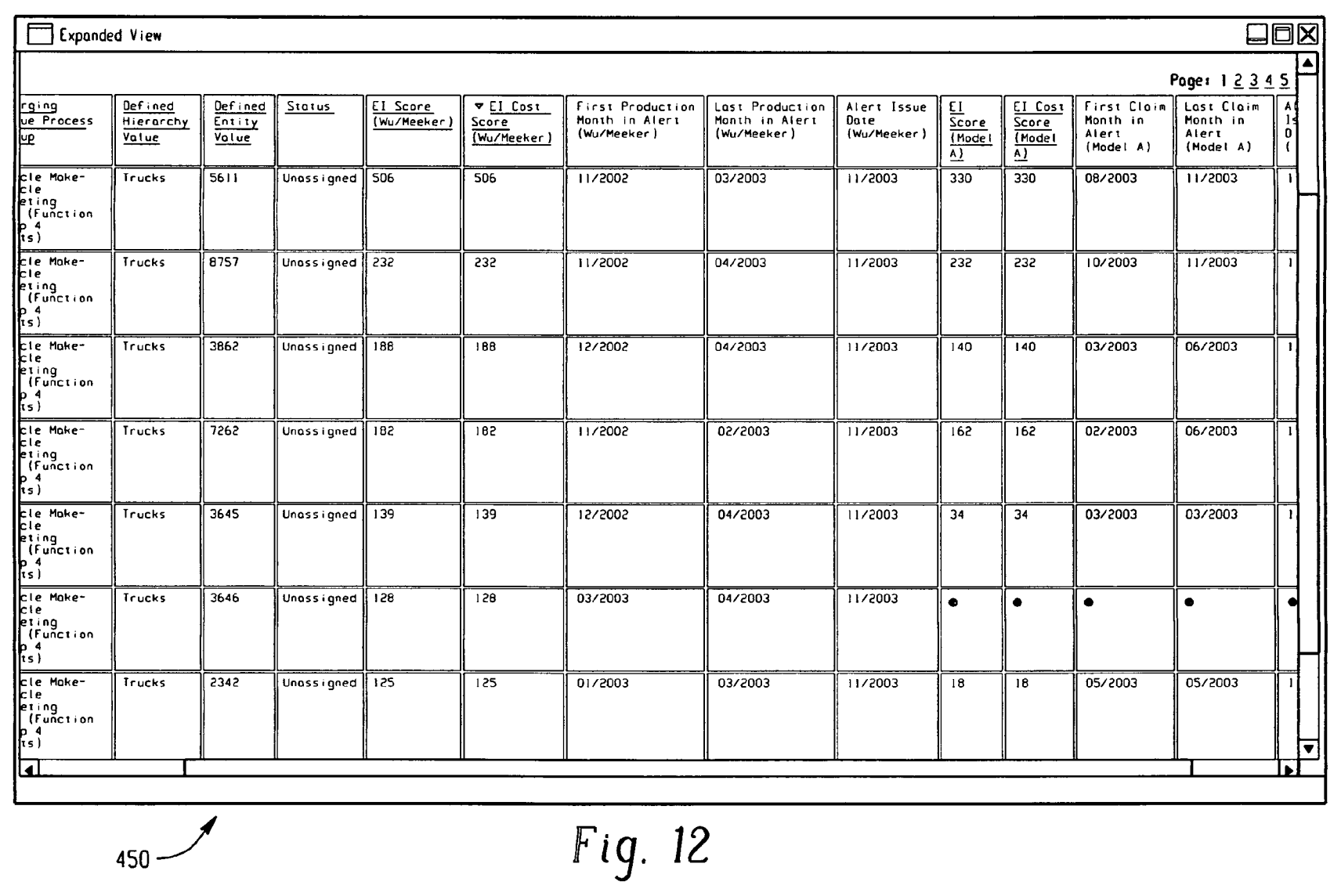

FIG. 12 shows at 450 a GUI wherein a user is shown emerging issue information, such as the score value generated by a claim period model approach. For example, the first row in the table shows for a particular vehicle that there was a claim period model score of 330. This indicates that there were 330 greater than expected claims for vehicles produced in the analyzed claims period. In this example, the claims period was from August 2003 to November 2003.

Figure 13:
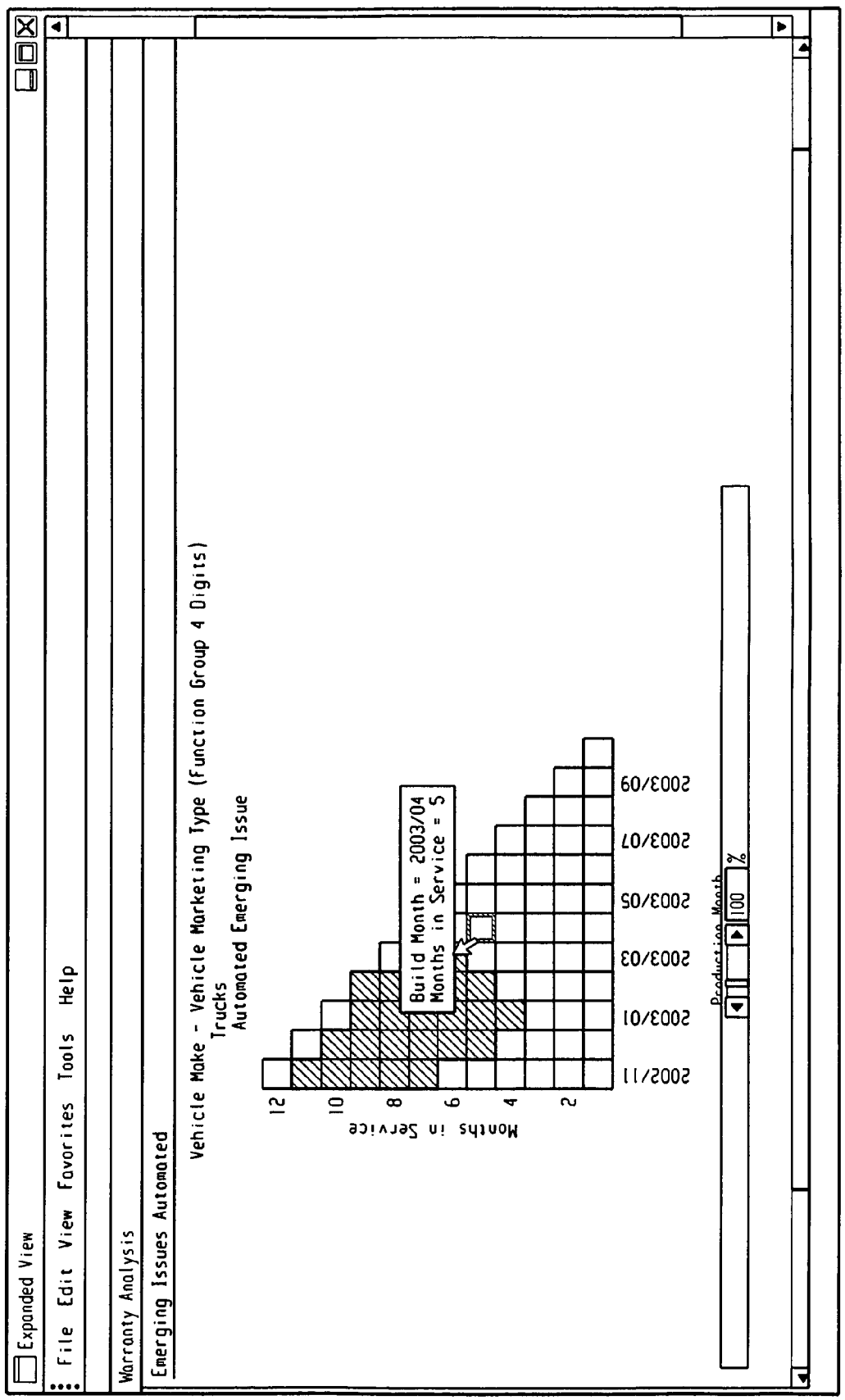

FIG. 13 shows at 500 a GUI wherein a user is shown detailed information regarding why a particular emerging issue received a particular Wu/Meeker score. The graph in the figure shows production month along the x-axis and months in service along the y-axis. Blocks that are filled in represent where the actual value met or exceeded the critical value. Accordingly, the filled-in blocks highlight what caused the particular score.

Figure 14:
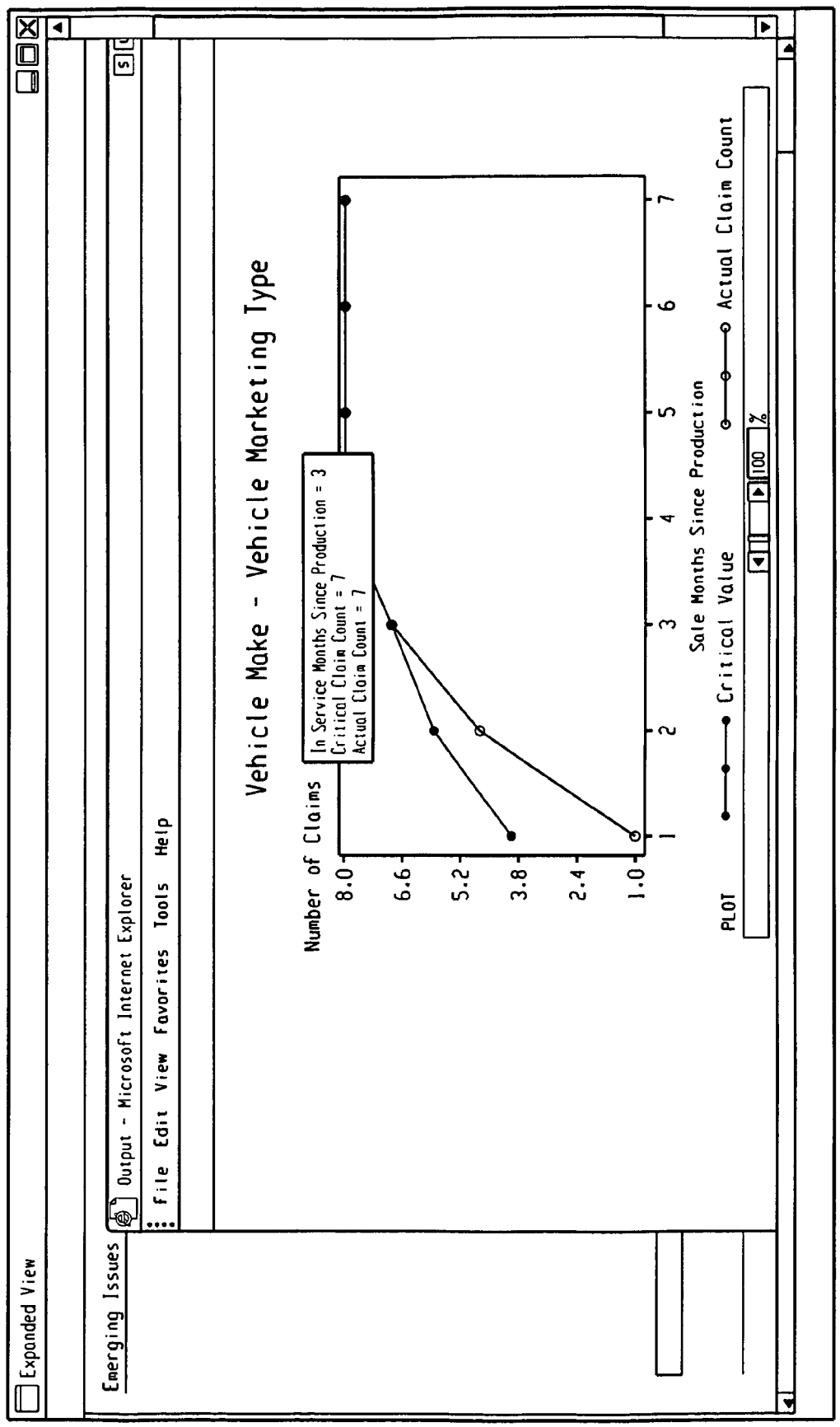

FIG. 14 shows at 550 a GUI wherein a user is shown detailed information regarding why a particular emerging issue received a particular claim period model score. The graph in the figure shows sale months since production along the x-axis and number of claims along the y-axis. If the actual claim count meets or exceeds a critical value of claims count, then this is used to determine whether there is an emerging issue.

Figure 15:
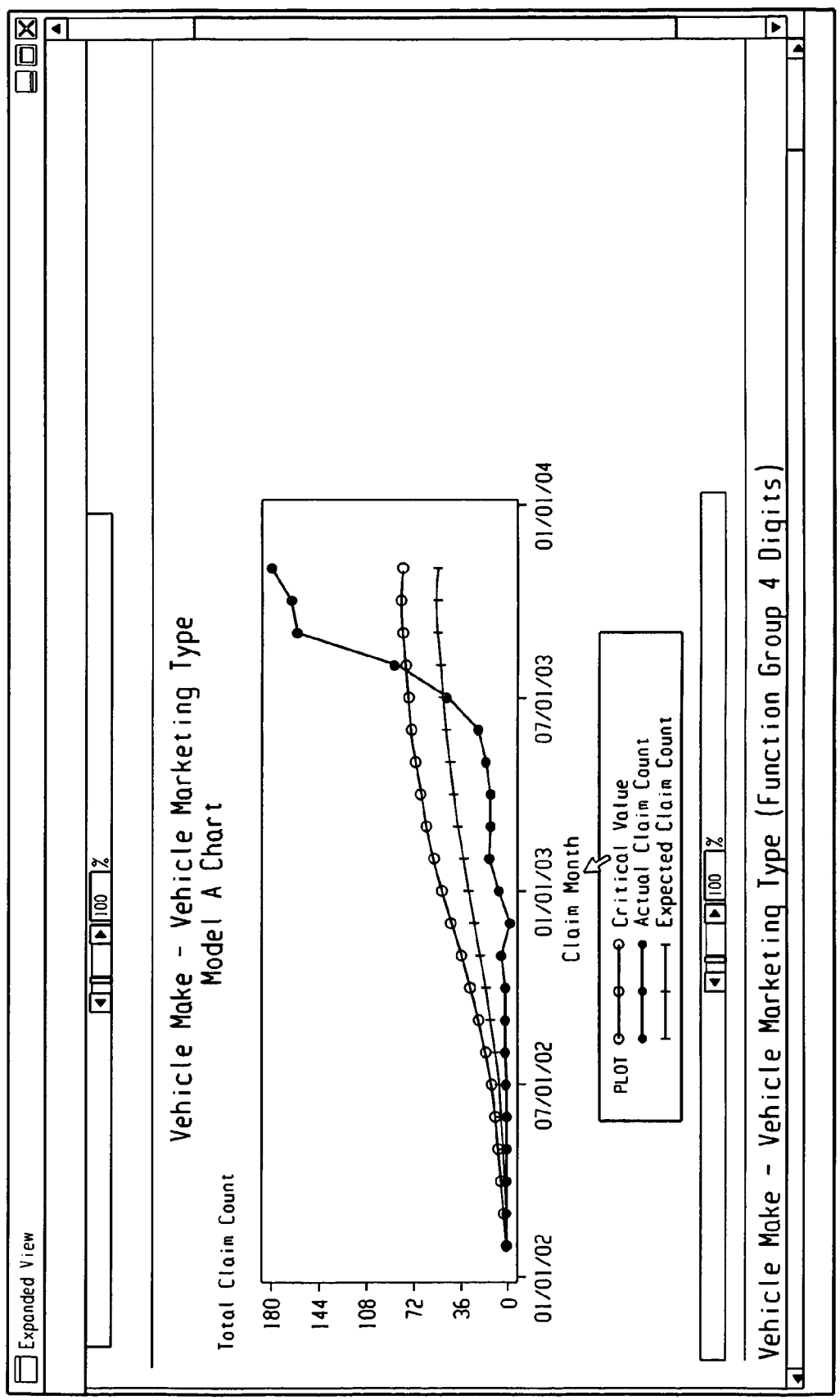

FIG. 15 shows at 600 a GUI wherein a user is shown detailed information regarding why a particular emerging issue received a particular claim period model score. The graph in the figure shows claim month along the x-axis and number of claims along the y-axis. If the actual claim count meets or exceeds a critical value of claims count, then this is used to determine whether there is an emerging issue.

Figure 16:
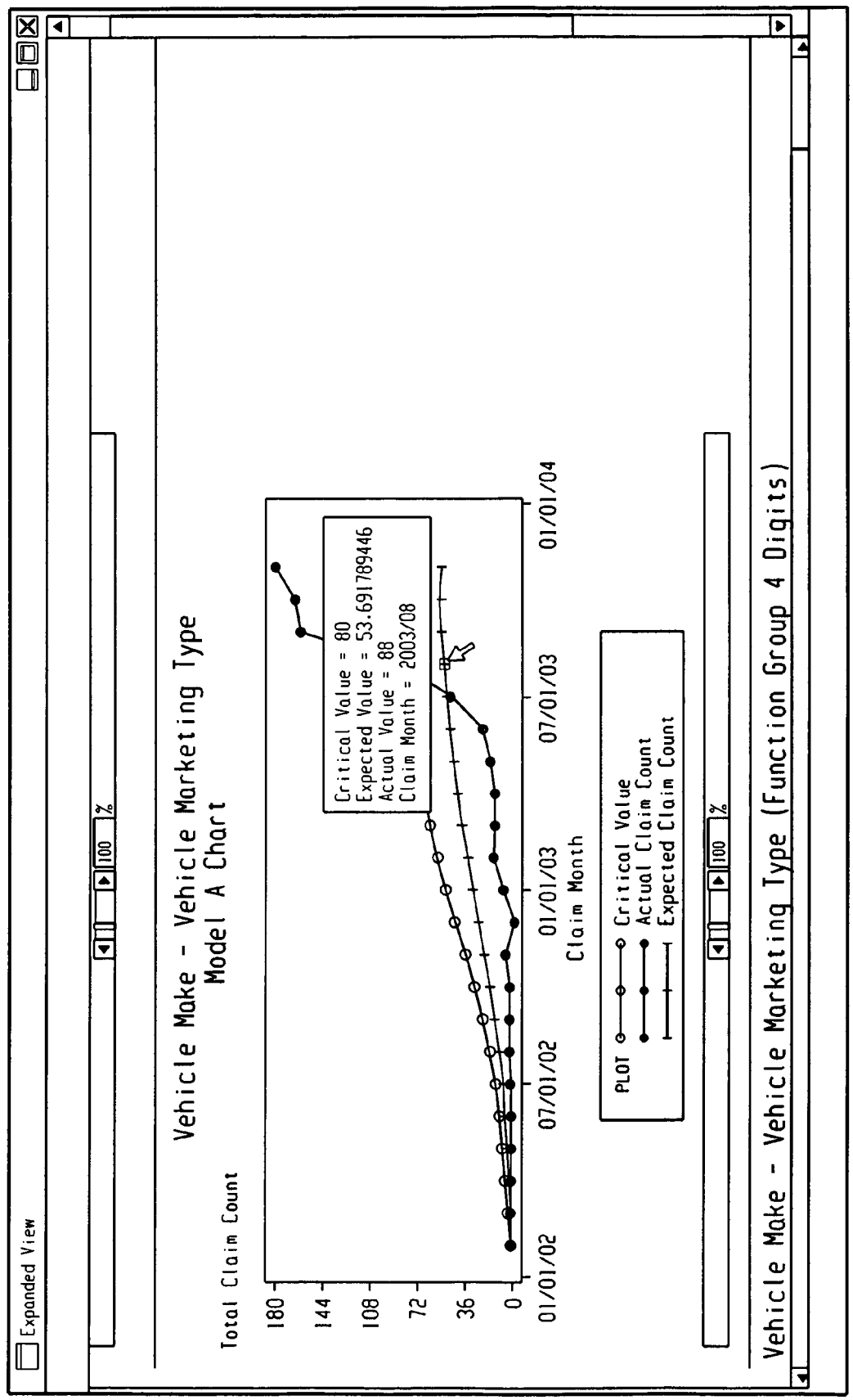
Figure 17:
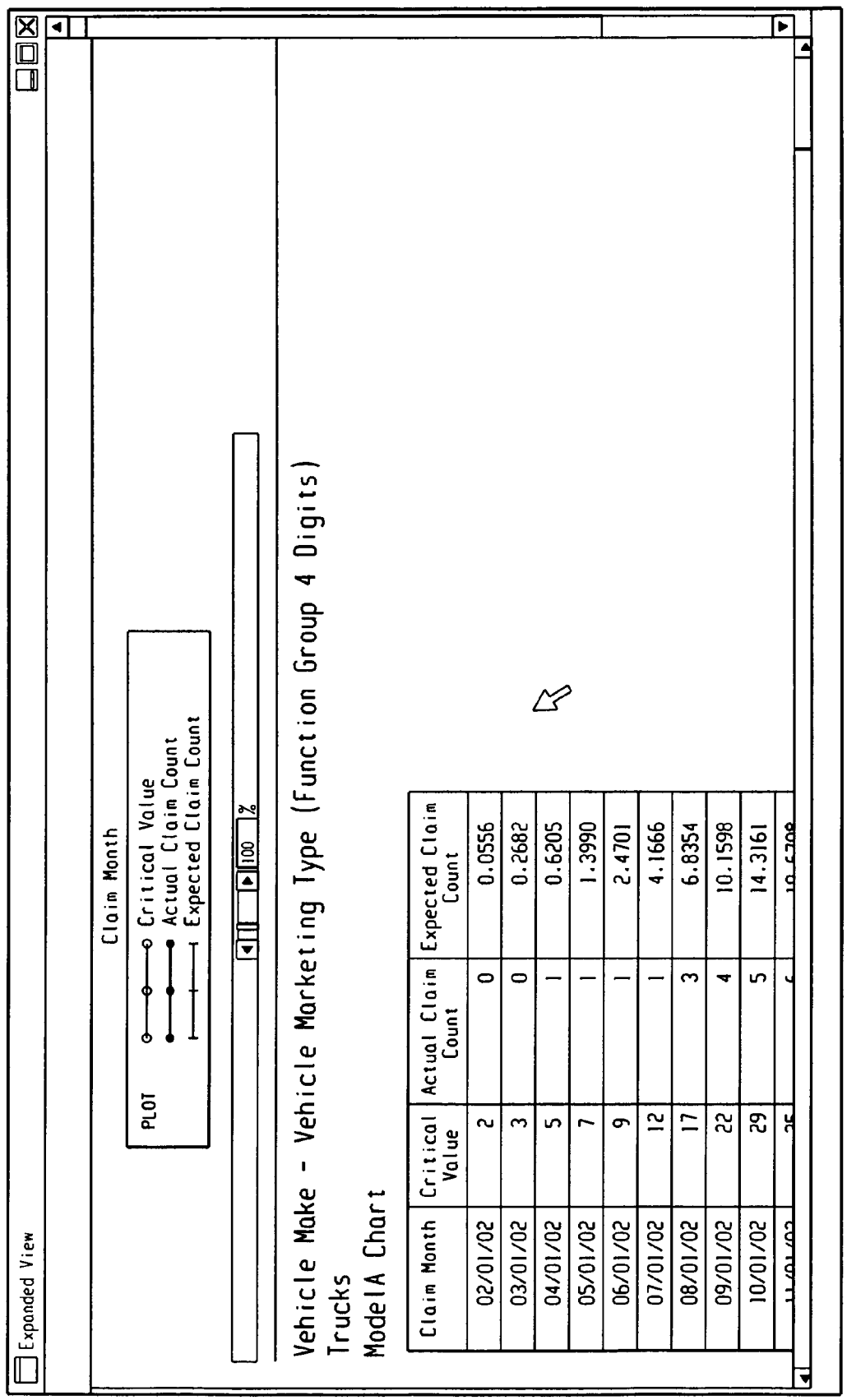

FIG. 16 shows at 650 values for a particular point on the graph, and FIG. 17 shows at 700 a tabular version of the graph.

FIG. 18 shows at 750 a GUI wherein a user can provide a status with respect to a particular emerging issue. This allows sorting and/or filtering of emerging issues for use in managing the potentially large number of emerging issues that may be uncovered. Example status values include: unassigned, assigned, resolved, and closed. As an illustration, an administrator can elect to view only those emerging issues that are unassigned or issues that have been assigned to a particular person or group.

While examples have been used to disclose herein the approaches, the scope of the disclosure can include other examples that occur to those skilled in the art. For example, production period model analysis and claim period model analysis can be used separately by a user or both can be used by a user. As an illustration, a hybrid approach can be used, wherein a production period model approach can be used for a first portion of a warranty period and a claim period model approach can be used for the second portion of a warranty period. For example, if a warranty period is five years for a purchased washer appliance, then a production period model approach can be used for the first three years of the five year warranty period, and a claim period model approach can be used for the two year remainder of the warranty period. This method recognizes that the more time periods that a production period model approach has to analyze, the less power the production period model has to offer for the warranty analysis.

Figure 19:
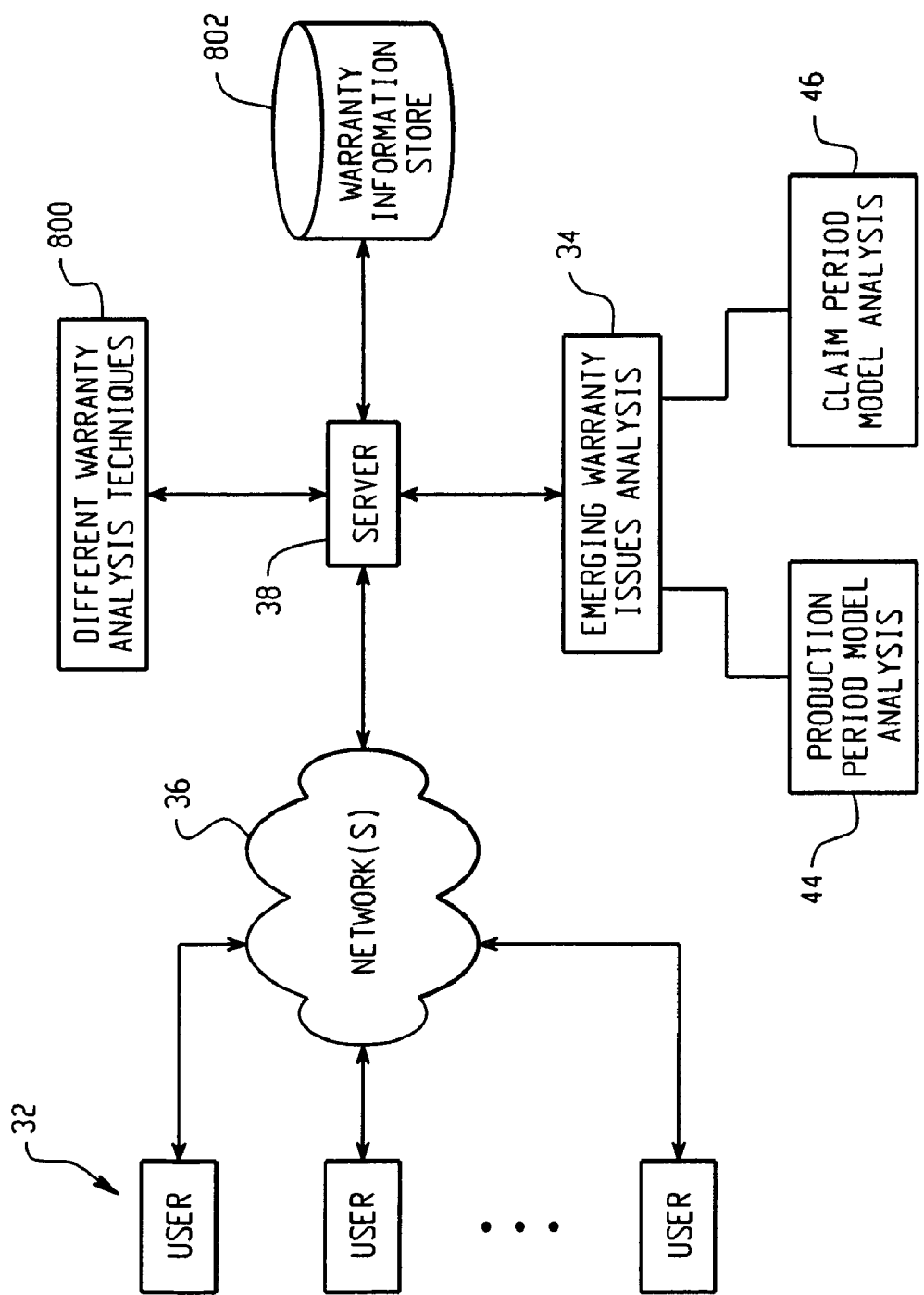
FIG. 19 is a block diagram depicting that production period model analysis and claim period model analysis can be used with other warranty analysis techniques.

As another example, production period model analysis and claim period model analysis can be used with other warranty analysis techniques as shown at 800 in FIG. 19. Other warranty analysis techniques 800 are described in the commonly owned U.S. patent application Ser. No. 11/493,388 (entitled "Computer-Implemented Systems And Methods For Warranty Analysis" filed Jul. 26, 2006). As an illustration, such techniques could include:

Pareto Analysis
Trend/Control Chart Analysis
Exposure Analysis
Trend by Exposure Analysis
Statistical Drivers Analysis
Reliability Analysis
Forecasting
Time of Claim Analysis
Geographical Analysis
Detail Report Analysis
Etc.

By providing a rich assortment of warranty analysis techniques, users can be proactive with the warranty data by using the analytics to surface emerging issues and accelerate the process of identifying problems and analyzing their root causes. The analysis techniques can access a warranty information store 802 which stores warranty and other needed information. The access can be via the server 38 as shown in FIG. 19. However it should be understood that although a server is shown in the figures, a server system can be used, such as a distributed server or computer system.

Users can create and save to the warranty information store specific filtering criteria to apply to the one or more warranty analyses. These filter definitions can include both product attributes (e.g., production, repair, and sales dates) and claim/event attributes (e.g., claim dates, etc.). Reports can be generated based upon the warranty analysis and the filter definitions.

In addition to allowing filtering of product attributes and claim/event attributes as well as reporting to occur, the warranty analysis techniques may also allow users to interact with the results from the warranty analysis. As an example of user interaction analysis, a user could drill into the subset of information for an individual bar on a Pareto chart to see a trend chart; they could then obtain a list of customer comments related to a spike on the trend chart. The feature-rich set of analytics provides a clear view of not only what happened but also why it may have happened.

The software warranty analysis system may be divided into logical parts to provide ease of use, yet allow for sophisticated analytical investigation. For example, defining which data to analyze can be decoupled from how to analyze it. This means that the same subset of data can be used repeatedly in any number of analyses to reduce the time and space required to perform each pass. It allows flexibility in allowing users to run additional analyses using a specific data point on a chart (e.g., drill-to analysis). This technique provides flexibility in choosing next steps and lends itself well to the natural progression of root cause analysis required by most users.

As yet another example of the wide scope of the systems and methods disclosed herein, it should be understood that the steps and the order of the steps in the flowcharts and the processing flows described herein may be altered, modified, removed and/or augmented and still achieve a desired outcome. It is further noted that the systems and methods may be implemented on various types of computer architectures, such as for example on a single general purpose computer or workstation, or on a networked system, or in a client-server configuration, or in an application service provider configuration.

It is also noted that the systems and methods may include data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

The invention claimed is:

1. A computer-implemented method for analyzing warranty issues, comprising:
using statistical analysis, by one or more data processors, to detect one or more warranty issues by examining one or more claim counts within a time period;
using a robust estimator, by the one or more data processors to calculate claim intensities corresponding to the one or more claim counts;
estimating, by the one or more data processors, one or more seasonality factors using a logistic regression model, wherein the estimated seasonality factors correspond to variations in claim intensities relative to the time period;
using the estimated one or more seasonality factors to determine a type of warranty analysis to perform upon the one or more claims, by the one or more data processors, wherein warranty analysis types include a production period model analysis and a claim period model analysis;
performing, by the one or more data processors, emerging issue analysis using the warranty analysis, wherein the results of the emerging issues analysis are reconciled;
processing, by the one or more data processors, one or more alerts based upon the reconciled emerging issues analysis, wherein each alert has an associated alert index score; and
generating, by the one or more data processors, a graphical interface display including the reconciled emerging analysis results according to the associated index scores.

2. The method of claim 1, wherein the time period is a production period, sales period, time in service period, or claim period.

3. The method of claim 1, wherein the graphical interface is displayed on one screen or on multiple screens.

4. The method of claim 1, wherein the estimating one or more seasonality factors are multiplicative and account for variations in claim levels relative to a claim month.

5. The method of claim 1, further comprising:
displaying detailed information regarding why an alert received a particular alert index score, wherein the detailed information includes a graph that shows production month and months in service, and wherein the graph contains blocks that are filled in to represent where an actual claim count value met or exceeded a critical claim count value.

6. The method of claim 1, wherein the one or more warranty issues are detected within received warranty data including one or more units, and wherein an in-service date is not required to be known for each unit contained in the received warranty data.

7. The method of claim 6, wherein the in-service date identifies how long a product has been in service at a particular point in time.

8. The method of claim 6, wherein the statistical analysis estimates time in-service of units that do not have an in-service date in the received warranty data, and wherein the estimation of time in-service includes using a build date of a unit and a build-to-sale lag profile.

9. The method of claim 8, wherein the build-to-sale lag profile is a lognormal distribution of a number of days between a time when the unit was built and a time when the unit went into service, and wherein the build-to-sale lag profile is developed from units that have an in-service date in the data.

10. The method of claim 1, wherein using statistical analysis includes using call center data to detect one or more warranty issues.

11. The method of claim 1, wherein the statistical analysis includes performing an analysis on a cumulative number of claims received in a time period for products produced in a pre-specified previous number of time periods.

12. The method of claim 1, wherein the statistical analysis approximates distribution of $C_t$ as a Poisson distribution;
wherein $C_t$ is the cumulative number of claims received in the claim period t for products produced in the pre-specified previous number of period.

13. A computer-program product, tangibly embodied in a machine-readable storage medium, including instructions configured to cause a data processing apparatus to:
use statistical analysis to detect one or more warranty issues by examining one or more claim counts within a time period;
use a robust estimator to calculate claim intensities corresponding to the one or more claim counts;
estimate one or more seasonality factors using a logistic regression model, wherein the estimated seasonality factors correspond to variations in claim intensities relative to the time period;
use the estimated one or more seasonality factors to determine a type of warranty analysis to perform upon the one or more claims, wherein warranty analysis types include a production period model analysis and a claim period model analysis;
perform emerging issue analysis using the warranty analysis, wherein the results of the emerging issues analysis are reconciled;
process one or more alerts based upon the reconciled emerging issues analysis, wherein each alert has an associated alert index score; and
generate a graphical interface display including the reconciled emerging analysis results according to the associated index scores.

14. A system for analyzing warranty issues, comprising:
one or more processors;
a computer-readable storage medium containing instructions configured to cause the one or more processors to perform operations, including:

using statistical analysis to detect one or more warranty issues by examining one or more claim counts within a time period;

using a robust estimator to calculate claim intensities corresponding to the one or more claim counts;

estimating one or more seasonality factors using a logistic regression model, wherein the estimated seasonality factors correspond to variations in claim intensities relative to the time period;

using the estimated one or more seasonality factors to determine a type of warranty analysis to perform upon the one or more claims, wherein warranty analysis types include a production period model analysis and a claim period model analysis;

performing emerging issue analysis using the warranty analysis, wherein the results of the emerging issues analysis are reconciled;

processing one or more alerts based upon the reconciled emerging issues analysis, wherein each alert has an associated alert index score; and generating a graphical interface display including the reconciled emerging analysis results according to the associated index scores.

* * * * *